United States Patent [19]

Molo

[11] Patent Number: 5,711,491
[45] Date of Patent: Jan. 27, 1998

[54] FOOD GRATER

[75] Inventor: Nicholas J. Molo, Aldinga Beach, Australia

[73] Assignee: Dart Industries Inc., Orlando, Fla.

[21] Appl. No.: 564,029

[22] Filed: Dec. 19, 1995

[51] Int. Cl.⁶ .................................................. A47J 43/25
[52] U.S. Cl. .................... 241/95; 241/100; 241/168; 241/273.1; 241/285.2
[58] Field of Search ........................... 241/83, 95, 100, 241/168, 273.1, 285.2, 285.3

[56] References Cited

U.S. PATENT DOCUMENTS

| | | |
|---|---|---|
| D. 230,241 | 2/1974 | Riddington ................... 241/95 X |
| D. 331,687 | 12/1992 | Gilbert. |
| D. 337,489 | 7/1993 | So. |
| D. 343,098 | 1/1994 | Shun. |
| D. 343,099 | 1/1994 | So. |
| D. 354,886 | 1/1995 | Diefenbach. |
| 2,615,486 | 10/1952 | Marcus. |
| 2,714,908 | 8/1955 | Carmack ...................... 241/95 |
| 2,720,234 | 10/1955 | Fett ............................ 241/95 X |
| 3,416,584 | 12/1968 | Rowley ........................ 241/95 |
| 3,495,639 | 2/1970 | Johansson .................... 241/95 |
| 3,825,049 | 7/1974 | Swett et al. |
| 4,212,431 | 7/1980 | Doyel. |
| 4,247,054 | 1/1981 | Schulein et al. ............. 241/95 |
| 4,928,893 | 5/1990 | Prindle ........................ 241/95 |
| 5,083,734 | 1/1992 | Ancona et al. |
| 5,312,054 | 5/1994 | Feer et al. |
| 5,379,954 | 1/1995 | Funke ........................ 241/101.2 |

OTHER PUBLICATIONS

Hong Kong Enterprise, Jun. 1991, p. 544, KI MEE Metal & Plastic.
Hong Kong Household, Oct. 1984, p. 9, and Dec. 1984 pp. 52 & 56.
Chef Line –Gripy, 1 p. (No Date Given).

*Primary Examiner*—John M. Husar
*Attorney, Agent, or Firm*—John A. Doninger

[57] ABSTRACT

A food grater including a grater blade removably mounted to the forward face of an upwardly and rearwardly inclined housing positioned for the reception of the grated foodstuff. The housing has a handle pivotally secured to the rear thereof and movable between an open rearwardly and downwardly inclined position bracing the housing, and a forward folded position partially nested within the rear portion of the housing.

17 Claims, 4 Drawing Sheets

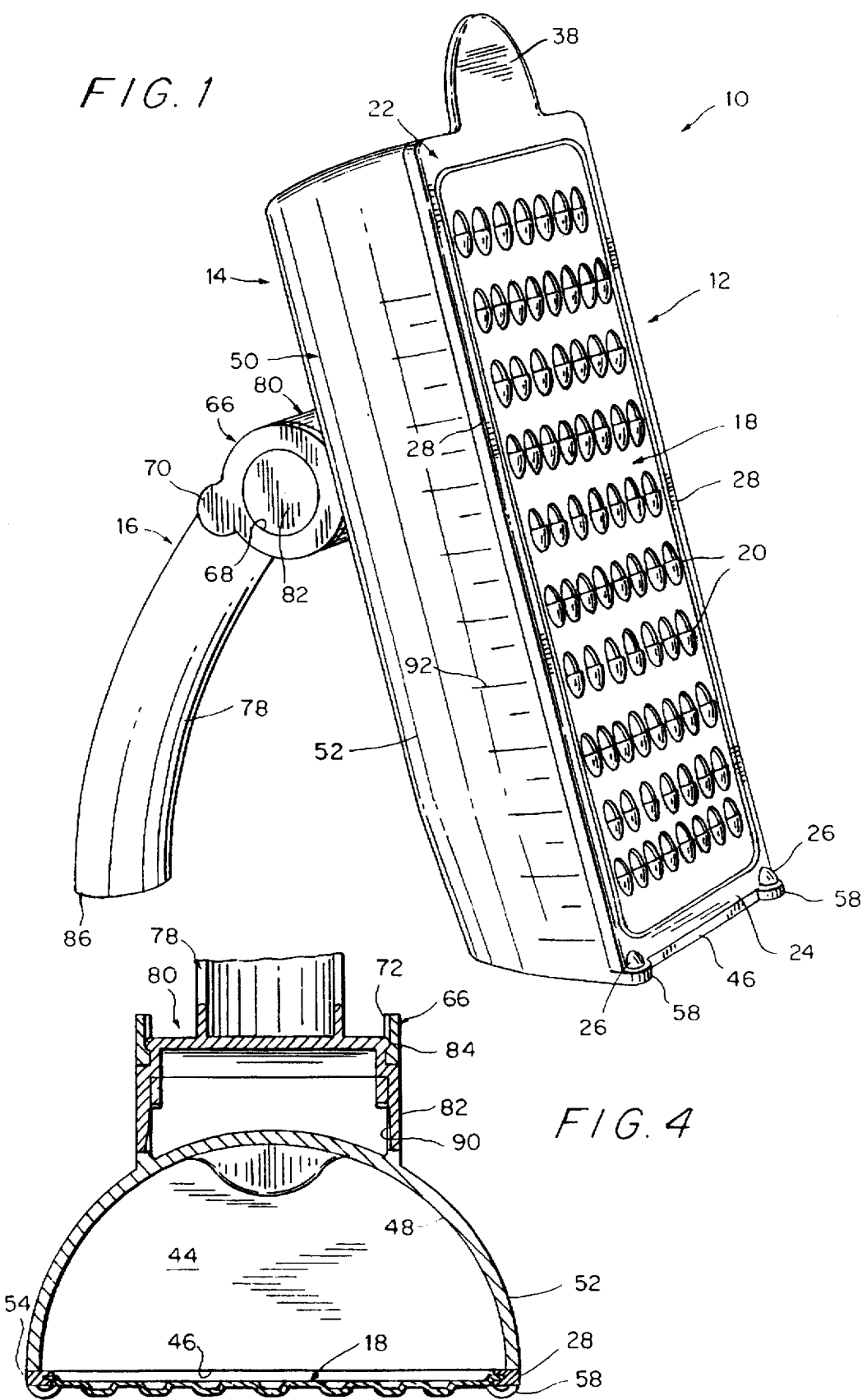

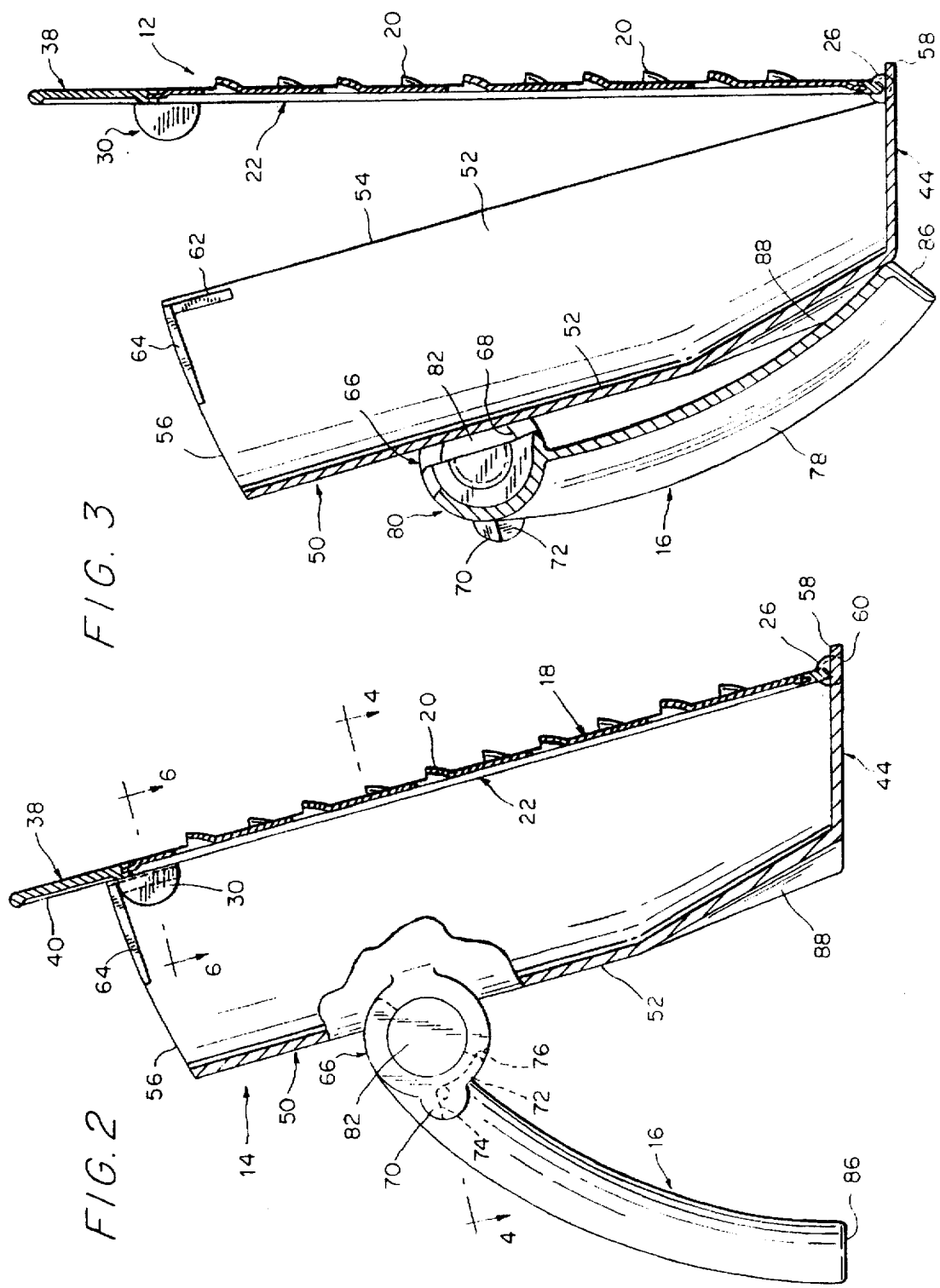

FOOD GRATER

BACKGROUND OF THE INVENTION

The invention is generally concerned with food preparation, and specifically relates to food graters of the type wherein a solid or substantially solid food, normally cheese, is moved across a series of cutter elements provided in a sheet for a cutting or shredding of the food into small particles, thin strips, and the like, depending upon the specific configuration of the cutter elements.

Such graters, in one form or another, have been known and used for years.

The known graters, in the simplest forms, include a flat panel or sheet, usually of metal, with a series of cutter elements formed therefrom with adjacent openings whereby material cut from the food block is received through the openings and deposited on the countertop or plate on which the grater is supported.

The blade sheet, in some instances, can be associated with a housing for a collection of the grated food and for assisting in holding or stabilizing the blade sheet during use. While handles of some sort are normally associated with the conventional graters, such handles frequently appear to have been provided with little consideration for ease of handling and maintaining the grater in an operative position during use. Similarly, in those known instances wherein the blade is associated with a receptacle housing, the blade is either not removable, thus making a cleaning of the blade awkward, or, if removable, is frequently not sufficiently locked into position in the housing as to prevent movement during the normally relatively rough grating action.

SUMMARY OF THE INVENTION

The present invention proposes an improved grater wherein the grater blade releasably mounts to a housing as one wall thereof, and, when mounted, is locked against any relative movement during the normal grating procedure.

The housing is configured to, in the operative position of the grater, incline the blade slightly to facilitate access thereto and movement of food thereacross. A handle is pivotally mounted to the housing in opposed relation to the blade and, when opened, provides an outwardly angling brace to stabilize the housing during use of the grater, either with or without an actual grasping of the pivoting handle. The handle, in its closed position, partially nests within a recess defined in the housing so as to compact the unit for easy storage.

The blade is also provided with a handle, the relationship between the blade and the housing being such as to enable a user to directly grasp the blade, at the top thereof and along with the adjacent upper portion of the housing, for enhanced stabilization of the grater.

The housing is of an elongate semi-cylindrical configuration and preferably is transparent or translucent with external calibrations to provide a ready indication of the volume of grated food accumulated therein. The cylindrical configuration facilitates cleaning the housing, and an angular relationship between the upstanding semi-cylindrical wall and the horizontal base at the lower end of the housing provides for a simplified discharge of the housing contents upon removal of the grater blade.

The housing and housing handle will preferably be formed of an appropriate food compatible rigid synthetic resinous material, while the blade sheet and cutters defined therefrom will preferably be metal for superior cutting ability. The blade, in addition to the metal blade sheet, will also have a synthetic resinous frame thereabout with the blade handle integrally formed therewith, the frame including component parts which appropriately releasably lock to companion components on the housing.

Other features of the invention, advantages derived, and details thereof, will become apparent from the more specific description of the invention following hereinafter.

BRIEF DESCRIPTION OF THE DRAWINGS

FIG. 1 is a perspective view of the grater positioned for use;

FIG. 2 is a vertical cross-sectional view through the grater, with the housing handle in elevation;

FIG. 3 is a vertical sectional view with the grater blade in a partially inserted position and with the housing handle folded;

FIG. 4 is a transverse cross-sectional view taken substantially on a plane passing along line 4—4 in FIG. 2;

DESCRIPTION OF PREFERRED EMBODIMENT

Figure 5:
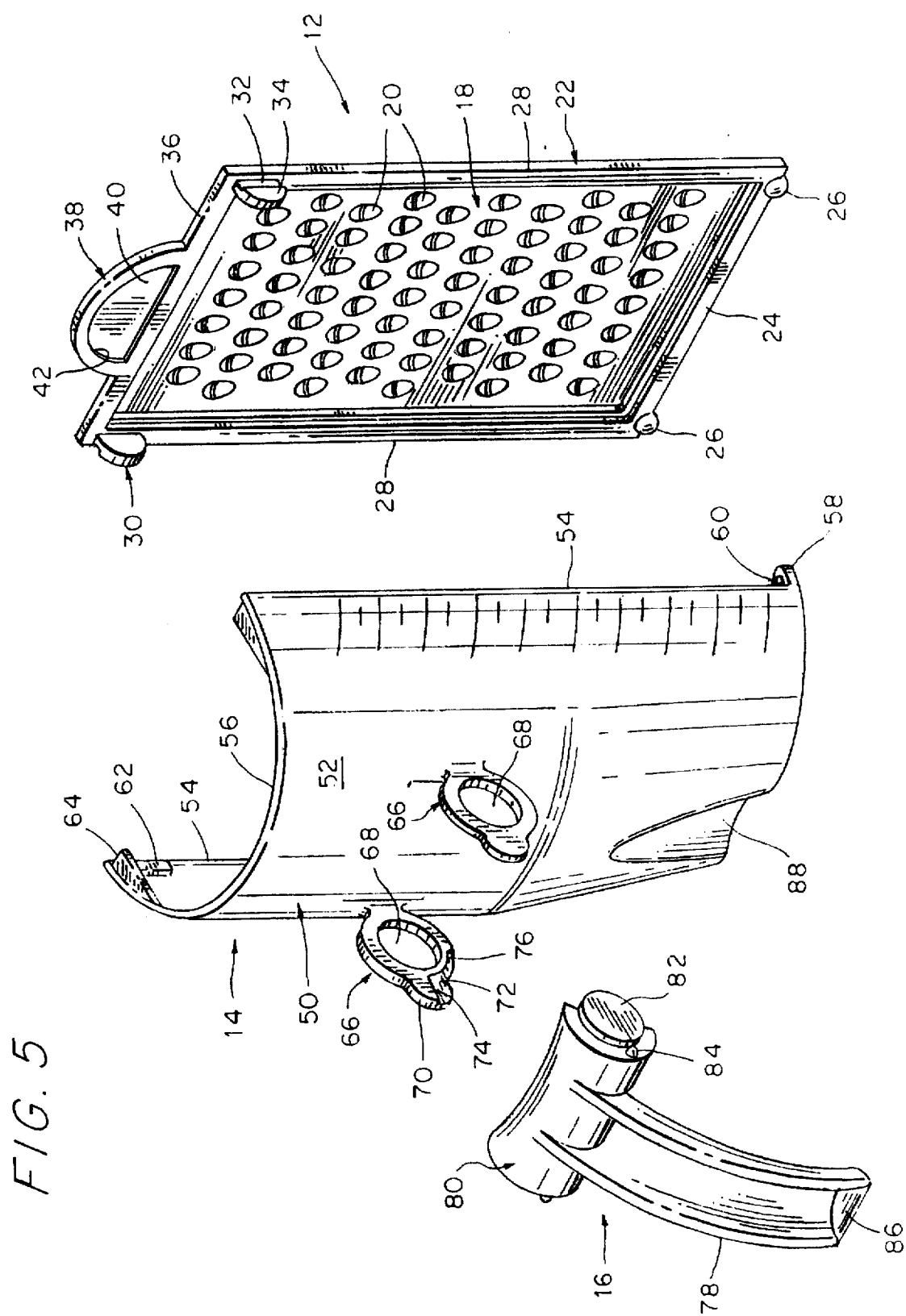
FIG. 5 is an exploded perspective view of the components of the grater.

Referring now more specifically to the drawings, the grater 10 consists basically of three components, the grater blade 12, the housing 14 and the housing handle 16.

The grater blade 12 includes a thin metal blade sheet 18 with multiple cutters or cutter elements 20 formed therefrom and extending from a common face thereof. Each cutter element is backed by a corresponding opening through the sheet 18 whereby, in the manner of a conventional grater blade, grated foodstuff is discharged to the rear face of the blade sheet 18. While a specific arrangement of cutter elements has been illustrated, it will be appreciated that the cutters will be configured and arranged in accordance with the grater action desired.

The blade sheet 18, which incidentally is preferably rectangular and, in operative position, vertically elongate, is surrounded by a rigid synthetic resinous frame 22 within which the peripheral edges of the sheet 18 are intimately molded.

Figure 7:
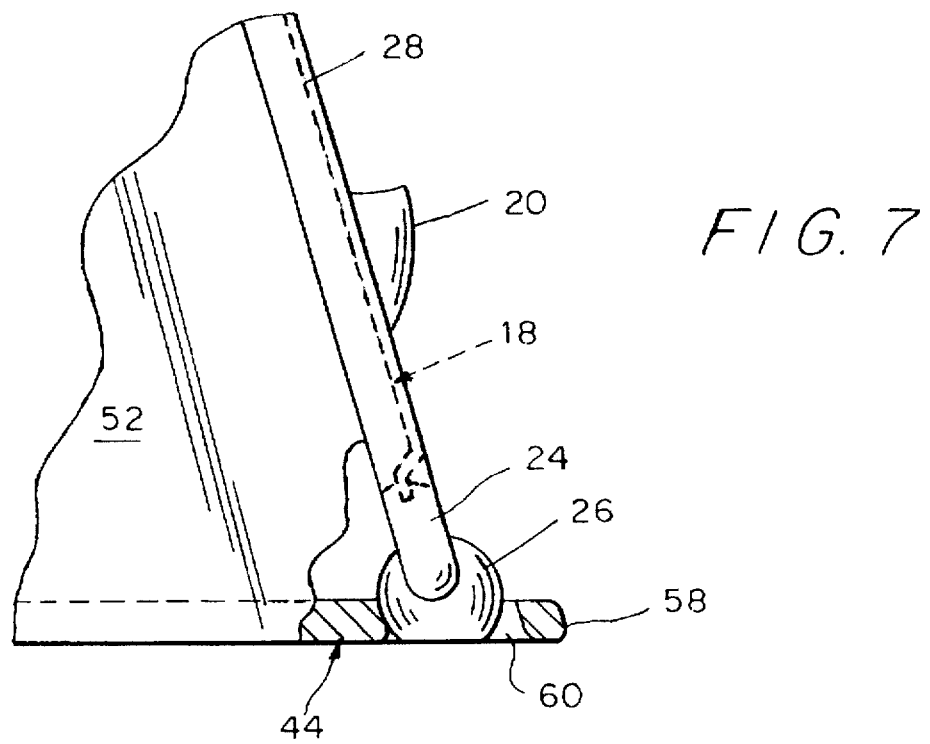
FIG. 7 is a detail illustration, partially in section, illustrating the lower mounted end of the blade.

The frame 22, adjacent the opposed ends of the lower bar 24 thereof has a pair of enlarged ball-shaped mounting lugs 26 integrally formed therewith. The lugs, as best noted in the detail of FIG. 7, completely surround the lower portion of the lower bar 24 and extend both therebelow and beyond the opposed faces thereof.

The opposed side bars 28, adjacent the upper ends thereof, include a pair of integral substantially rigid ears 30 projecting rearwardly relative to the forwardly facing cutters 20. Each ear is semi-circular and includes a full height groove 32 in the laterally directed outer face 34 thereof immediately adjacent the corresponding side bar 28. In addition, each ear rearward of the groove 32 has the outer face 34 thereof slightly tapered to define a progressively narrowing configuration toward the free edge of the ear 30.

The transverse top bar 36 of the frame 22 has, centrally thereof, an upwardly projecting, semi-circular, coplanar, integrally formed handle 38. This blade handle 38, for ease of grasping, is provided with a depression 40 in the rear face thereof defining an arcuate undercut shoulder 42 to prevent a slipping of the fingers of the user under what might be moist or wet conditions depending upon the foods involved.

The housing 14 includes a planar semi-circular base panel 44 having a straight forward edge 46 and an arcuate periphery 48 between the opposed end portions of the forward edge 46.

The housing 14 further includes an elongate semi-cylindrical body 50 defined by an arcuate wall 52, the lower edge of which is integral with the arcuate edge 48 of the base panel 44. The housing wall 52 has opposed elongate forward edges 54 which align with the opposed ends of the forward edge 46 of the base panel 44. Noting FIGS. 1 and 2 in particular, in the use position of the food grater 10, the base panel 44 is horizontally oriented to rest on a countertop or the like. The semi-cylindrical body 50 extends upwardly therefrom and is inclined rearwardly at an angle of approximately 75° to the horizontal or the plane of the base panel 44.

The grater blade 12 releasably mounts to and closes the forward face of the body 50 of the housing 14 for the full height thereof from the base panel forward edge 46 to the arcuate upper edge 56 of the body wall 52. In order to mount the grater blade 12, the housing base panel 44, at the opposed end portions of the linear forward edge 46, is provided with a pair of forwardly projecting ears 58 each having a central recess therein or aperture 60 therethrough which receive the depending ball-configured lugs 26 on the lower corners of the blade frame 22. The apertures 60 are so positioned as to, upon receiving the lugs 26, allow the blade 12 to rotate rearwardly to a position wherein the opposed upright bars 28 of the frame 22 engage, in a substantial intimate manner, against the forward edges 54 of the housing wall 52.

Figure 6:
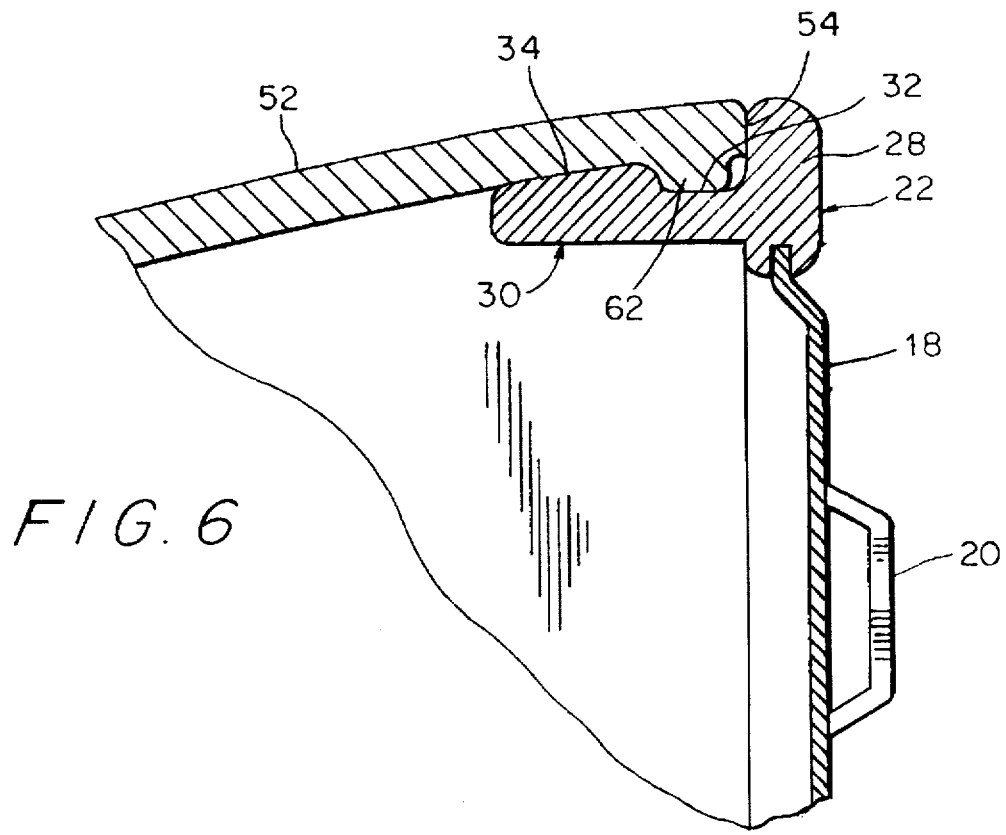
FIG. 6 is an enlarged cross-sectional detail taken substantially on a plane passing along line 6—6 in FIG. 2.

At the upper end of the housing body 50, immediately inward of each forward edge 54 and in slightly downwardly spaced relation to the upper wall edge 56, is a vertically elongate lug 62 paralleling the corresponding forward edge 54. The shape and positioning of the lugs 62 are such as to releasably lock within the grooves 32 provided in the outer faces of the ears 30 integrally formed adjacent the upper corners of the frame 22 of the grater blade 12. Each of the lugs 62 has an overlying guiding flange 64 integral with the body wall 52 immediately thereabove to ensure a proper engagement of the lugs 62 with the grooved ears 30 as the grater blade is pivoted rearwardly into its locked position. The flanges 64 are also of particular significance in preventing any tendency for the grater blade to upwardly shift and accidently detach from the housing during the grating or cutting operation. The foodstuff, while cutting on the down stroke, can also produce an upward force on the return stroke. Any tendency for the grater blade to release from the lower sockets or apertures 60 through this return motion is prevented by the overlying flanges 64. With regard to the releasable engagement of the upper and lower portions of the grater blade 12, attention is specifically directed to the detailed fragmentary sections of FIGS. 6 and 7. These Figures are also of interest in illustrating the close engagement of the blade frame 22 with the forward edges 54 of the body wall 52. The slightly beveled inner face 34 of each of the upper ears 30 is of significance in facilitating an inward movement of the ears 30 with the resilient flexibility inherent in the materials allowing for a sufficient degree of flexing to engage the lugs 62 within the grooves 32. As will be apparent, a slightly greater force will be required to disengage the grater blade 12 from the housing 14.

When mounted, the handle 38 of the grater blade projects above the open upper end of the housing 14 and is readily accessible as a convenient means for holding or stabilizing the grater during use, with the hand both grasping the handle 38 and possibly resting on the upper edge defining the upper end of the housing body 50.

Turning now to the handle 16, it would be noted that the handle 16 pivotally mounts to the rear of the housing body between a pair of laterally spaced rearwardly extending arms or extensions 66 integrally formed with the housing wall 52, preferably above mid-height for maximum stabilization of the grater during use, as shall be described subsequently. Each of the extensions 66 is of a generally circular configuration with a central aperture 68 therethrough and a rearward extending projection 70. An arcuate recess 72 is defined in the inner face of each extension 66 radially outward from the central aperture 68 therein and opening through the outer periphery thereof. Each recess extends from approximately mid-height on the projection 70, defining a downwardly facing abutment shoulder 74, downwardly about an arc to a second abutment shoulder 76. The extent of the arc of the recesses 72 is such as to accommodate full swinging of the handle between the open and close positions thereof as will also be described subsequently.

The handle 16 includes an elongate grip or grip portion 78 which is longitudinally arcuate and integrally formed, at the upper end thereof, with a transverse head 80 having a pair of circular stub shafts 82 projecting from the opposed ends thereof. The shafts 82 are rotatably received within the extension openings 68.

It is contemplated that both the handle grip 78 and the head 80 have arcuate or generally semi-circular transverse cross-sections. The grip 78, along the length thereof, opens outwardly or rearwardly and has a flat outer end base panel 86. The head 78 opens inwardly toward the housing body 50 and has a slight longitudinal arc between opposed semi-circular end walls to conform to the arc of the body wall 52.

The opposed end walls of the transverse head 80, radially outward from each of the stub shafts 82, includes a projecting lug or stop 84 which, upon a mounting of the handle to the extensions 66, engage within the opposed recesses 72 and, with the shoulders 74 and 76 on the extension 76, define the pivotal limits of the handle. With the grater in the use position, the handle 16 will be rearwardly swung with the stops 84 engaging the respective shoulders 74 and with the handle having the outer lower end 86 thereof in a common plane with the base panel 44 to engage a common support surface or countertop and thereby stabilize the grater and simultaneously provide a convenient hand grip remote from the grating surface and as an alternative to a grasping of the handle 38 and the upper portion of the housing.

Turning now to FIG. 3, it will be seen that in the closed or collapsed position of the handle 16, the lower portion of the grip 78 is received in a rearwardly directed recess 88 formed in the rear face of the housing wall 52 upwardly from the base panel 44, the recess tapering from a maximum width at the lower edge thereof to an apex portion upwardly spaced therefrom. In the collapsed position of the handle, the projecting handle lugs 84 will engage against the lower shoulder 76 on the handle mounting extensions 66 to provide a compact unit for ease of storage.

It is contemplated that the handle releasably mounted between the extensions 66 with inherent resilient flexibility within the extensions 66 allowing for a snap-locking of the handle stub shafts 82 within the apertures 68. Release of the handle is facilitated by the extension projections 70 which can be easily grasped and slightly outwardly spread. Noting the sectional detail of FIG. 4, it will be seen that the inner surfaces of the stub shafts 82, forwardly beyond the corresponding head end walls, have a beveled inner face 90 which, upon a mounting of the handle, allows for a slightly increased degree of flexibility as the stub shafts 82 move between the opposed extensions 66 to snap-engage within the apertures 68.

The housing 14 will act as a receptacle with an internal chamber for the grated or otherwise cut foodstuffs which will collect therein rearward of the grater blade 12. As a guide to the amount of processed food collected, the body wall 52 will have calibrations 92 along the vertical length thereof with the collected contents being visible through the cutter openings or through transparent or translucent sections within the body wall itself. The collected contents will also be visible through the open upper end of the housing body.

The handle 16 in addition to forming a brace and handle for stabilization of the grater during use, also provides a convenient handle for dispensing the processed foodstuff through the open upper end of the housing.

The components of the grater are formed of food-compatible readily cleaned materials, with the components themselves being readily separated from each other to facilitate cleaning, blade replacement, and the like.

The foregoing is considered illustrative of the features of the invention, and the disclosed embodiment is not to be considered a limitation on the scope of the invention as set forth in the claims appearing hereinafter.

I claim:

1. A food grater including an elongate body, a grater blade and a handle for said body; said body including a base panel having a periphery, a wall fixed to and extending upward from said base panel about a major portion of said periphery, said wall having an upper edge remote from said base panel, said wall having laterally spaced parallel side edges, said side edges extending from said base panel to said wall upper edge; said grater blade being removably positioned between and engaged with said side edges and extending upward from said base panel, wherein said grater blade, base panel and wall define a receptacle for the collection of grated food inward of said grater blade; said handle being engaged with said wall in spaced relation above said base panel and in opposed relation to said grater blade, said handle extending from said wall and terminating in a free outer end.

2. The food grater of claim 1 including pivot means pivotally mounting said handle to said wall for selected pivoting of said handle between a collapsed position closely adjacent said wall and an extended position outwardly and rearwardly angling from said wall, said handle, in said extended position, having said outer end in a substantially common plane with said body base panel for braced positioning of said grater on a support surface.

3. The food grater of claim 2, wherein said pivot means comprises a pair of laterally spaced extensions on said body wall extending rearwardly therefrom relative to said grater blade, said handle comprising a head extending between and rotatably engaged with said extensions, and a hand grip rigid with said head and extending laterally therefrom.

4. The food grater of claim 3, wherein said grip is elongate and accurate along the length thereof between said pivot means and said outer end of said handle, said wall extensions including arcuate recesses defined therein and terminating in opposed abutments, said handle head having opposed ends thereof adjacent said extensions, said opposed ends including projections received within said extension recesses and selectively engagable with said abutments to define pivot limits for said handles.

5. The food grater of claim 4, wherein said body wall, adjacent said base panel, includes a longitudinal recess defined therein and partially receiving said handle grip in said collapsed position of said handle.

6. The food grater of claim 2 wherein said body extends upwardly from said base panel and inclines rearwardly relative thereto toward said handle in said extended position of said handle to rearwardly incline said grater blade.

7. The food grater of claim 6 wherein said base panel, adjacent said side edges of said wall, includes upwardly opening sockets therein, said grater blade including a lower edge having opposed end portions with depending lugs defined thereat and removably received within said sockets, said grater blade having an upper edge portion, and releasable securing means securing said upper edge portion of said grater blade to said body wall adjacent said side edges thereof for cooperation with said socket-received lugs in retaining said grater blade on said body.

8. The food grater of claim 7 wherein said securing means comprises a pair of rearwardly projecting ears on said grater blade at said upper edge portion and receivable immediately inward of said body wall adjacent each side edge thereof, each of said ears including a retaining groove defined therein, said body wall, adjacent each side edge thereof, including a projection releasably receivable within the corresponding ear groove.

9. The food grater of claim 8 wherein said securing means includes means on said body wall overlying each body wall projection for limiting upward withdrawal of said lugs from said sockets.

10. The food grater of claim 8 wherein said body wall defines a collecting chamber inward of said grater blade for the collection of foodstuff processed through said grater blade, said body having volume-defining calibrations thereon along at least a major portion of the height thereof from said base panel.

11. The food grater of claim 10 wherein said grater blade includes an elongate grater sheet with cutter elements and companion openings defined therefrom, and a frame molded to and surrounding said sheet, said lugs and sockets being integral with said frame, and a blade handle integral with said frame and projecting centrally thereabove to extend above said body.

12. The food grater of claim 11 wherein said pivot means comprises a pair of laterally spaced extensions on said body wall extending rearwardly therefrom relative to said grater blade, said handle comprising a head extending between and rotatably engaged with said extensions, and a hand grip rigid with said head and extending laterally therefrom.

13. The food grater of claim 12 wherein said grip is elongate and accurate along the length thereof between said pivot means and said outer end of said handle, said wall extensions including arcuate recesses defined therein and terminating in opposed abutments, said handle head having opposed ends adjacent said extensions, said opposed ends including projections received within said extension recesses and selectively engagable with said abutments to define pivot limits for said handle.

14. The food grater of claim 13 wherein said body wall, adjacent said base panel, includes a longitudinal recess defined therein and partially receiving said handle grip in said collapsed position of said handle.

15. A food grater comprising an elongate body, said body including a base panel having a periphery, a wall fixed to and extending upward from said base panel about a major portion of said periphery, said wall having an upper edge remote from said base panel, said wall having laterally spaced parallel side edges, said side walls extending from said base panel to said wall upper edge; a grater blade removably positioned between said side edges and extending upward from said base panel, wherein said grater blade, base panel and wall define a receptacle for the collection of grated food inward of said grater blade, said base panel, adjacent said side edges of said wall, including upwardly opening sockets therein, said grater blade including a lower edge having opposed end portions with depending lugs defined thereat, said depending lugs being removably inserted downward into said sockets, said grater blade having an upper edge portion, and releasable securing means securing said upper edge portion of said grater blade to said body wall adjacent said side edges thereof for cooperation with said socket-received lugs in retaining said grater blade on said body.

16. The food grater of claim 15 wherein said securing means comprises a pair of rearwardly projecting ears on said grater blade at said upper edge portion and receivable immediately inward of said body wall adjacent each side edge thereof, each of said ears including a retaining groove defined therein, said body wall, adjacent each side edge thereof, including a projection releasably receivable within the corresponding ear groove.

17. The food grater of claim 16 wherein said securing means includes means on said body wall overlying each body wall projection for limiting upward withdrawal of said lugs from said sockets.

* * * * *